(12) United States Patent
Branson et al.

(10) Patent No.: US 9,195,559 B2
(45) Date of Patent: Nov. 24, 2015

(54) MANAGEMENT OF STREAM OPERATORS WITH DYNAMIC CONNECTIONS

(71) Applicant: International Business Machines Corporation, Armonk, NY (US)

(72) Inventors: Michael J. Branson, Rochester, MN (US); Bradford L. Cobb, Cedar Park, TX (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 13/712,336

(22) Filed: Dec. 12, 2012

(65) Prior Publication Data

US 2014/0164628 A1    Jun. 12, 2014

(51) Int. Cl.
*G06F 15/16*    (2006.01)
*G06F 11/30*    (2006.01)
*H04L 29/06*    (2006.01)

(52) U.S. Cl.
CPC ........ *G06F 11/3048* (2013.01); *H04L 65/4069* (2013.01)

(58) Field of Classification Search
None
See application file for complete search history.

(56) References Cited

U.S. PATENT DOCUMENTS

| | | | |
|---|---|---|---|
| 7,487,206 B2 * | 2/2009 | Gu et al. | 709/203 |
| 7,613,848 B2 | 11/2009 | Amini et al. | |
| 7,644,110 B2 | 1/2010 | Nishizawa et al. | |
| 8,095,690 B2 | 1/2012 | Kashiyama et al. | |
| 8,478,875 B2 * | 7/2013 | Gedik et al. | 709/226 |
| 8,560,526 B2 | 10/2013 | Santosuosso et al. | |
| 8,560,527 B2 | 10/2013 | Santosuosso et al. | |
| 8,639,809 B2 * | 1/2014 | Branson et al. | 709/225 |
| 8,676,948 B2 * | 3/2014 | Li | 709/223 |
| 2006/0195599 A1 | 8/2006 | Gedik et al. | |
| 2011/0044685 A1 * | 2/2011 | Ota et al. | 398/15 |
| 2011/0213802 A1 | 9/2011 | Singh et al. | |
| 2012/0179809 A1 * | 7/2012 | Barsness et al. | 709/224 |
| 2012/0218268 A1 | 8/2012 | Accola et al. | |
| 2013/0054779 A1 * | 2/2013 | Cradick et al. | 709/224 |
| 2014/0164601 A1 | 6/2014 | Branson et al. | |
| 2014/0177435 A1 | 6/2014 | Miyamoto et al. | |

OTHER PUBLICATIONS

Ballard et al., "IBM InfoSphere Streams: Harnessing Data in Motion", Sep. 2010. 360 pages, IBM Redbooks. http://www.redbooks.ibm.com/abstracts/sg247865.html.
IBM, "IBM Streams Processing Language Compiler Usage Reference", IBM InfoSphere Streams Version 2.0.0.4. 2011, 2012. pp. 1-72, IBM Corporation.

* cited by examiner

*Primary Examiner* — Brian P Whipple
(74) *Attorney, Agent, or Firm* — Jonathan V. Sry; James R. Nock

(57) ABSTRACT

One embodiment is directed to a method for processing a stream of tuples in a stream-based application. A stream operator may receive a stream of tuples. A stream manager may determine whether a dynamic connection exists at a first stream operator. The dynamic connection may connect the first stream operator to a second stream operator. The stream manager may poll the first stream operator and the second stream operator for a presence of the dynamic connection. The stream manager may modify processing of one or more upstream stream operators in response to a change in use of the dynamic connection.

13 Claims, 9 Drawing Sheets

MANAGEMENT OF STREAM OPERATORS WITH DYNAMIC CONNECTIONS

TECHNICAL FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program receive streaming data to be processed by a plurality of processing elements comprising one or more stream operators.

One embodiment is directed to a method for processing a stream of tuples in a stream-based application. A stream operator may receive a stream of tuples. A stream manager may determine whether a dynamic connection exists at a first stream operator. The dynamic connection may connect the first stream operator to a second stream operator. The stream manager may modify processing of the stream of tuples in response to a condition.

Another embodiment is directed to a method for processing a stream of tuples in a stream-based application. A stream operator may receive a stream of tuples. A stream manager may determine whether a dynamic connection exists at a first stream operator. The dynamic connection may connect the first stream operator to a second stream operator. The stream manager may poll the first stream operator and the second stream operator for a presence of the dynamic connection. The stream manager may modify processing of one or more upstream stream operators in response to a change in use of the dynamic connection.

Another embodiment is directed to a system for processing a stream of tuples in a stream-based application. A stream operator may receive a stream of tuples. A monitor may determine the presence of a dynamic connection between a first stream operator and a second stream operator. The stream manager may modify an upstream stream operator based on a change in use of the dynamic connection.

BRIEF DESCRIPTION OF THE DRAWINGS

Like reference numbers and designations in the various drawings indicate like elements.

DETAILED DESCRIPTION

Figure 1:
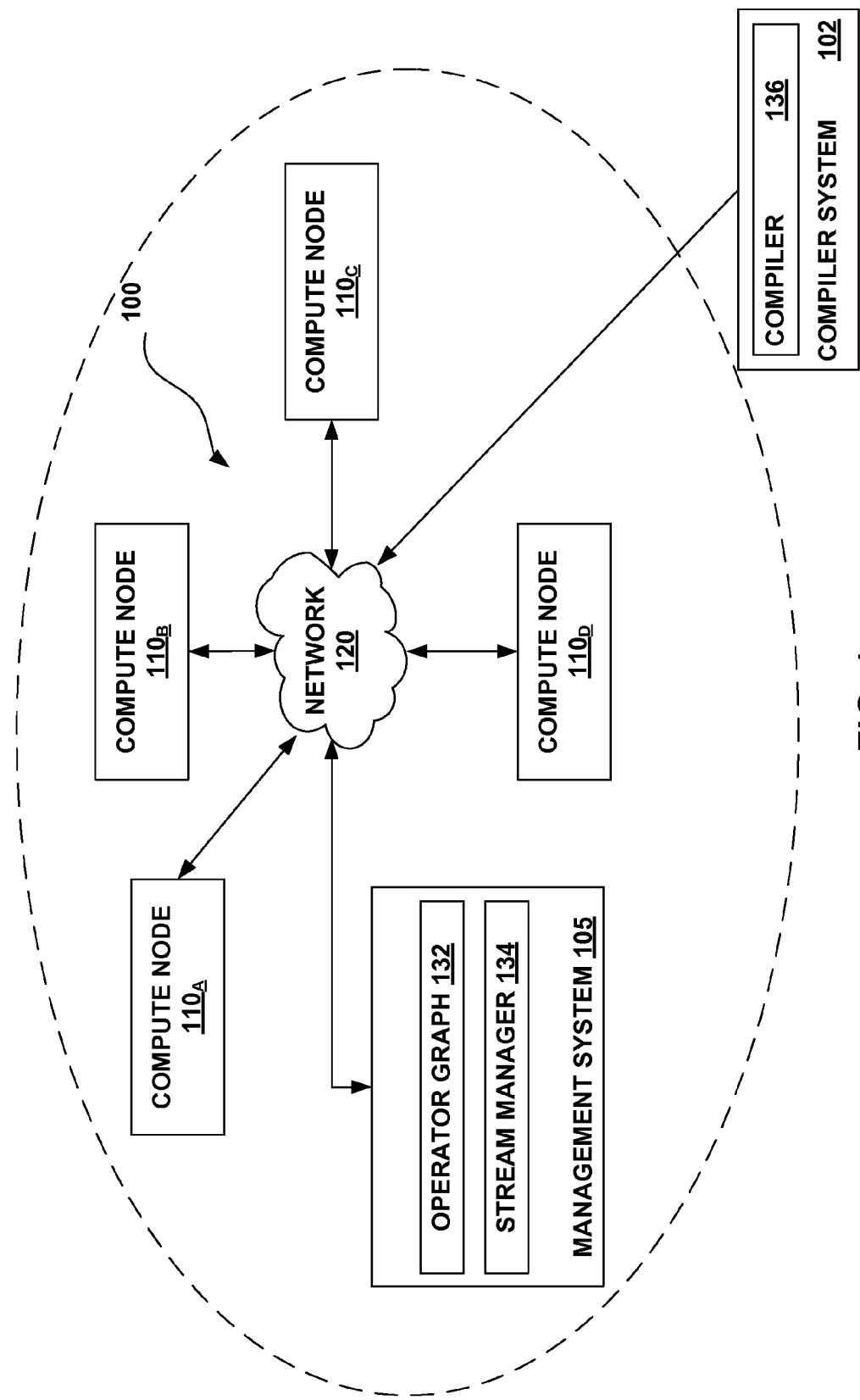
FIG. 1 illustrates a computing infrastructure configured to execute a stream computing application according to various embodiments.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream-based computing application, stream operators (which may be referred to as S.O. for brevity) are connected to one another such that data flows from one stream operator to the next (e.g., over a TCP/IP socket). Stream operators may have an output port that transmits data streams to other stream operators and an input port that receives data streams from other stream operators or sources. Scalability is achieved by distributing an application across compute nodes (discussed below) by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application.

A "tuple" is data. More specifically, a tuple is a sequence of one or more attributes associated with a thing. Examples of attributes may be any of a variety of different types, e.g., integer, float, Boolean, string, etc. The attributes may be ordered. A tuple may be extended by adding one or more additional attributes to it. In addition to attributes associated with a thing, a tuple may include metadata, i.e., data about the tuple. As used herein, "stream" or "data stream" refers to a sequence of tuples. Generally, a stream may be considered a pseudo-infinite sequence of tuples.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second.

Connections between stream operators may be either static or dynamic. In some configurations, static connections may be required connections and dynamic connections may be optional connections. According to various embodiments, a dynamic connection may be defined by an output stream produced by an operator that is directly connected to an export operator. Alternatively, a dynamic connection may be defined by the stream of tuples routed directly to the input of an import operator. An export operator may be an operator or a portion of an operator that routes a stream of tuples to various stream operators. An import operator may be an operator or a portion of an operator that receives a stream of tuples.

A streaming application may be modified by introducing one or more dynamic connections. The dynamic connections may allow the streaming application to introduce one or more stream operators without modifying the underlying operator graph. The dynamic connections may also be selectively disconnected which may improve performance. The term disconnect may be used interchangeably with deactivated since a stream operator with a disconnected input port may be deactivated, according to some embodiments. As an example of dynamic connections, a hedge fund may be interested in locating bargains in transactions from the stock market, but it may be specifically interested in bargains in two particular sectors, e.g., healthcare and technology. Furthermore, the hedge fund may be interested in transactions associated with a few specific companies. In situations like this, two or more bargain finding applications (at least one per sector) could be created and have their results output with tags indicating the sector and the particular stock symbol they carry. These bargain finding applications could be disconnected when the firm is no longer looking at those particular companies.

FIG. 1 illustrates one exemplary computing infrastructure 100 that may be configured to execute a stream-based computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 2:
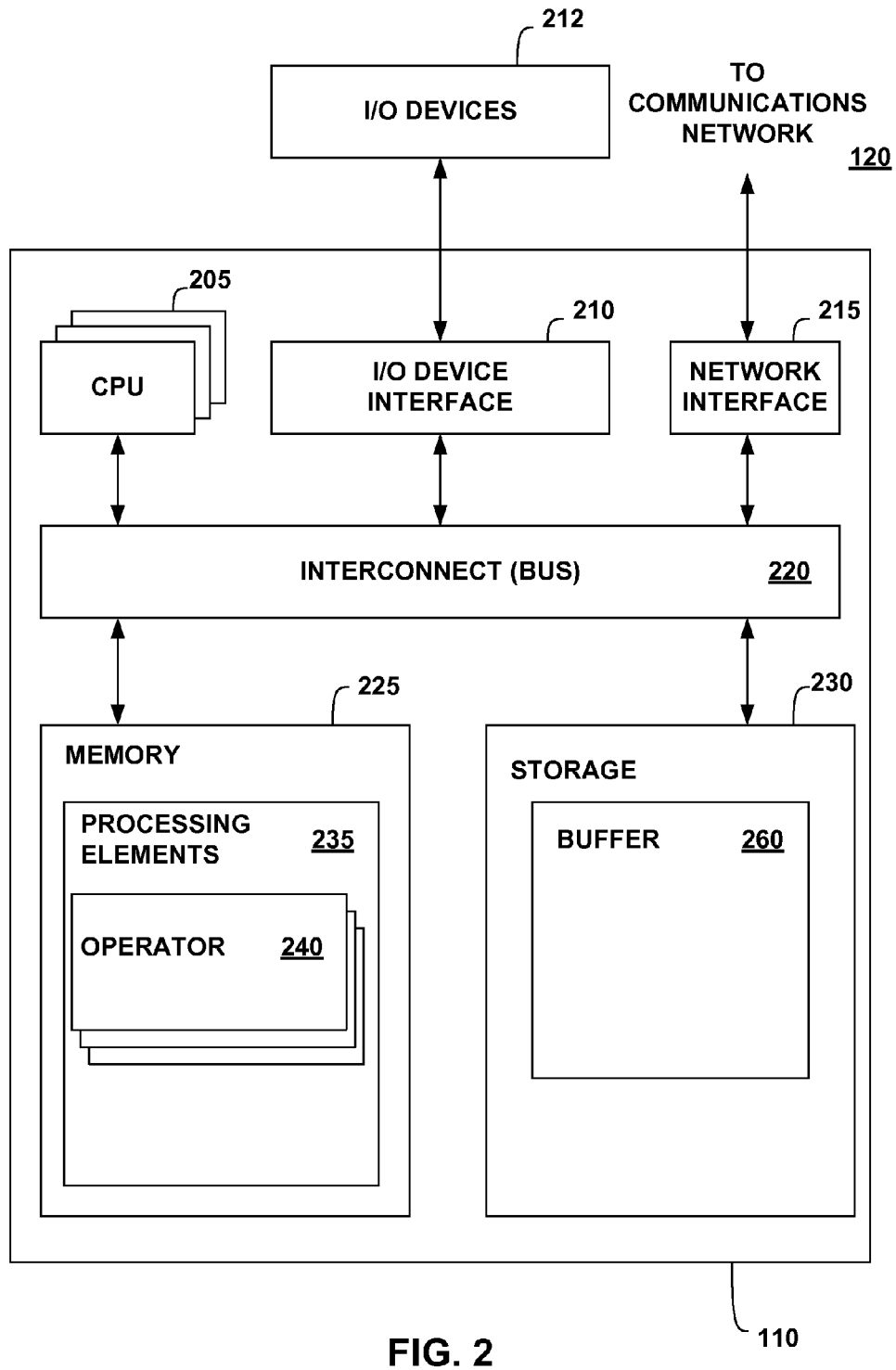
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A streams application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The data stream may be modified by any number of instances, which may occur at an application level. An instance may contain any number of jobs. An embodiment may focus on the dynamic connection between the jobs within an instance. The jobs may be further assigned to processing elements which may be defined by the one or more compute nodes that will run the processing element and services each compute node will be responsible for. Jobs may be submitted to an individual instance, and jobs may act either dependent on or independently from other jobs on the same instance. A job may be referred to as an application instance and may include various processing elements 235 or stream operators 240.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

Figure 3:
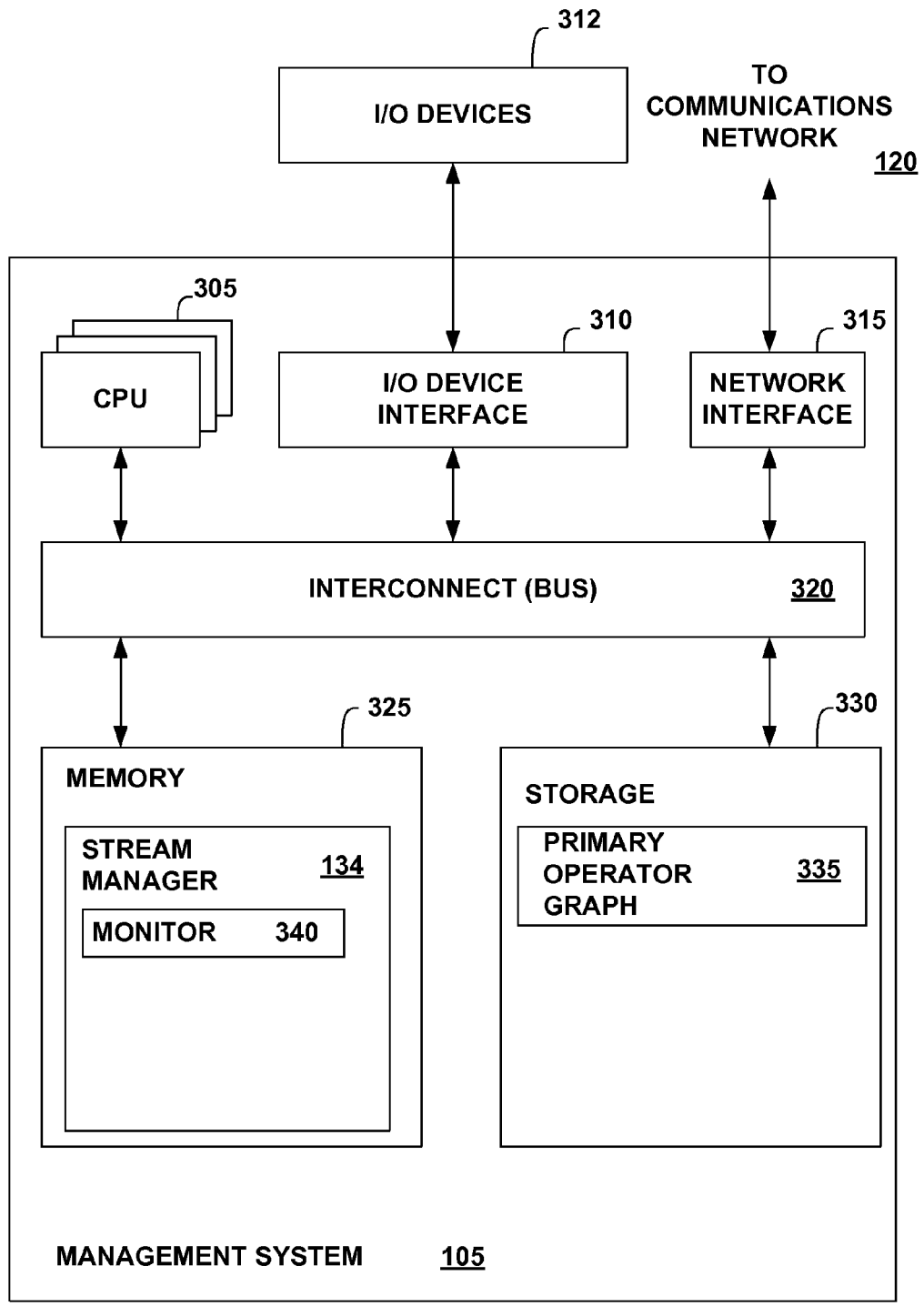
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 305, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, flash memory devices, network attached storage (NAS), connections to storage area-network (SAN) devices, or the cloud. The network interface 315 is configured to transmit data via the communications network 120.

The memory 325 may store a stream manager 134. The stream manager 134 may have a monitor 340. The monitor 340 may track of all of the dynamic connections within the operator graph 335 (discussed further in FIG. 6). Additionally, the storage 330 may store an operator graph 335. The operator graph 335 may define how tuples are routed to processing elements 235 (FIG. 2) for processing.

Figure 4:
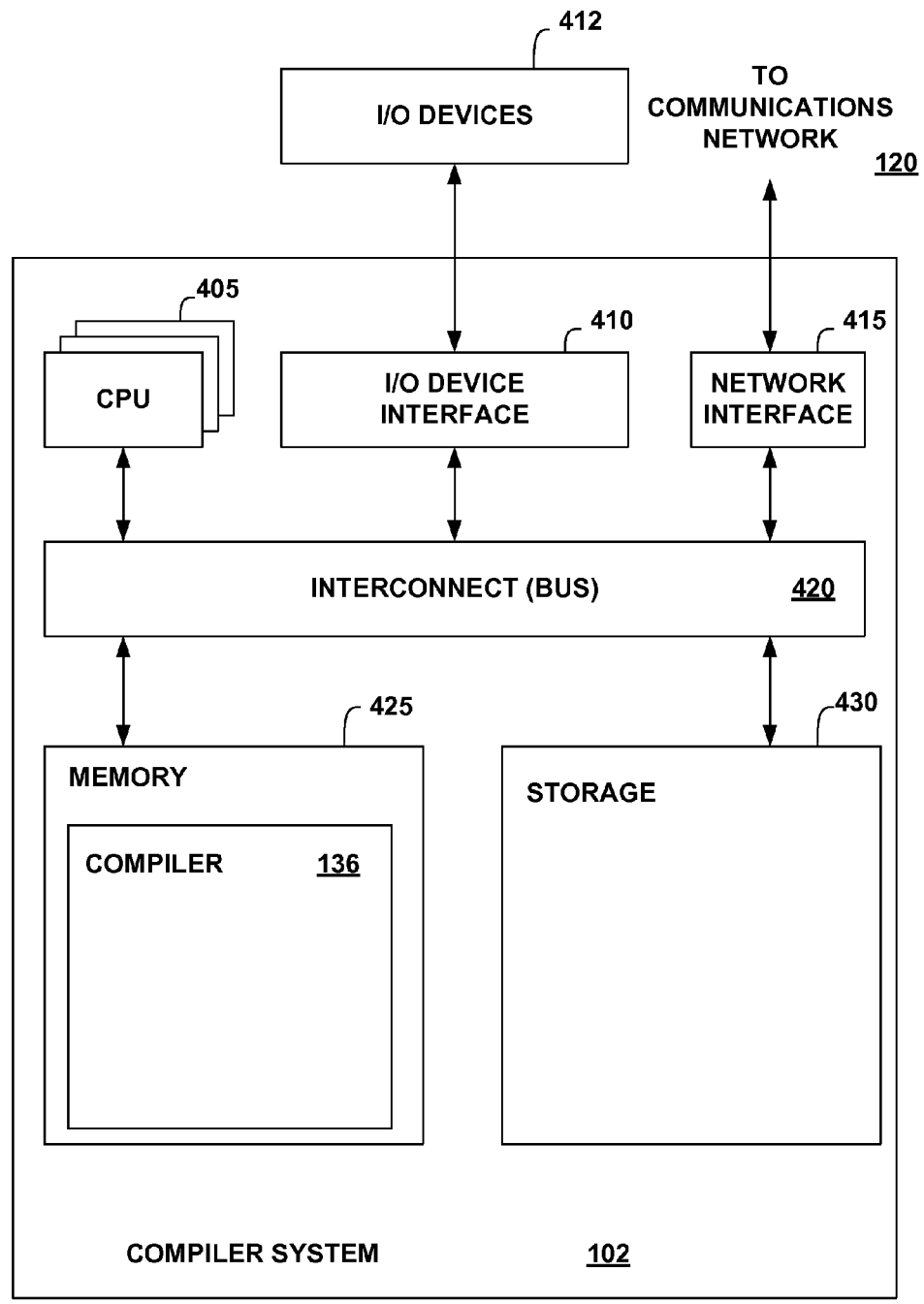
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the streaming application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
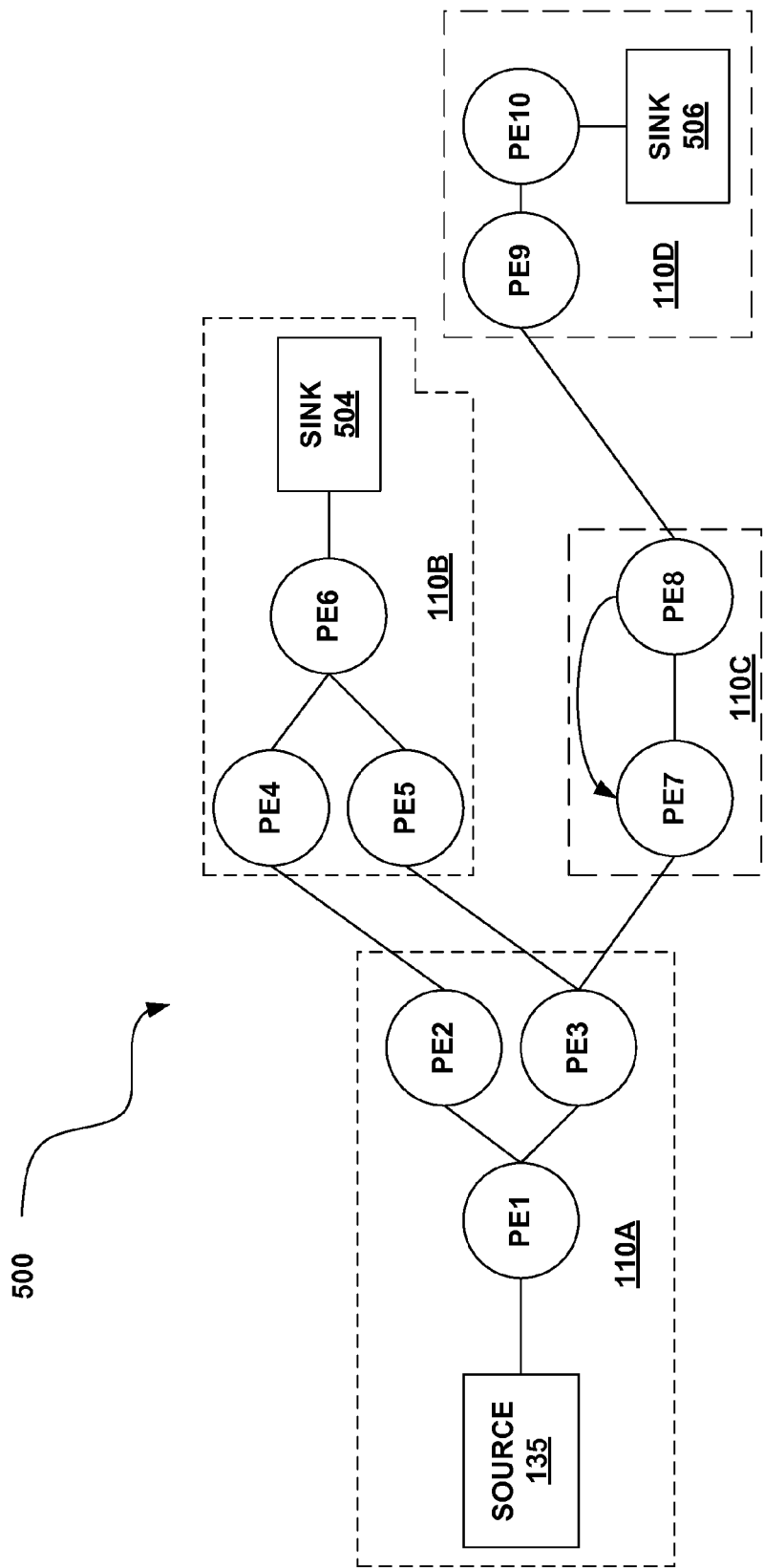
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins).

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Data that flows to PE2 is processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-10D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D. One example of a stream computing application is IBM®'s InfoSphere® Streams (note that InfoSphere® is a trademark of International Business Machines Corporation, registered in many jurisdictions worldwide).

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
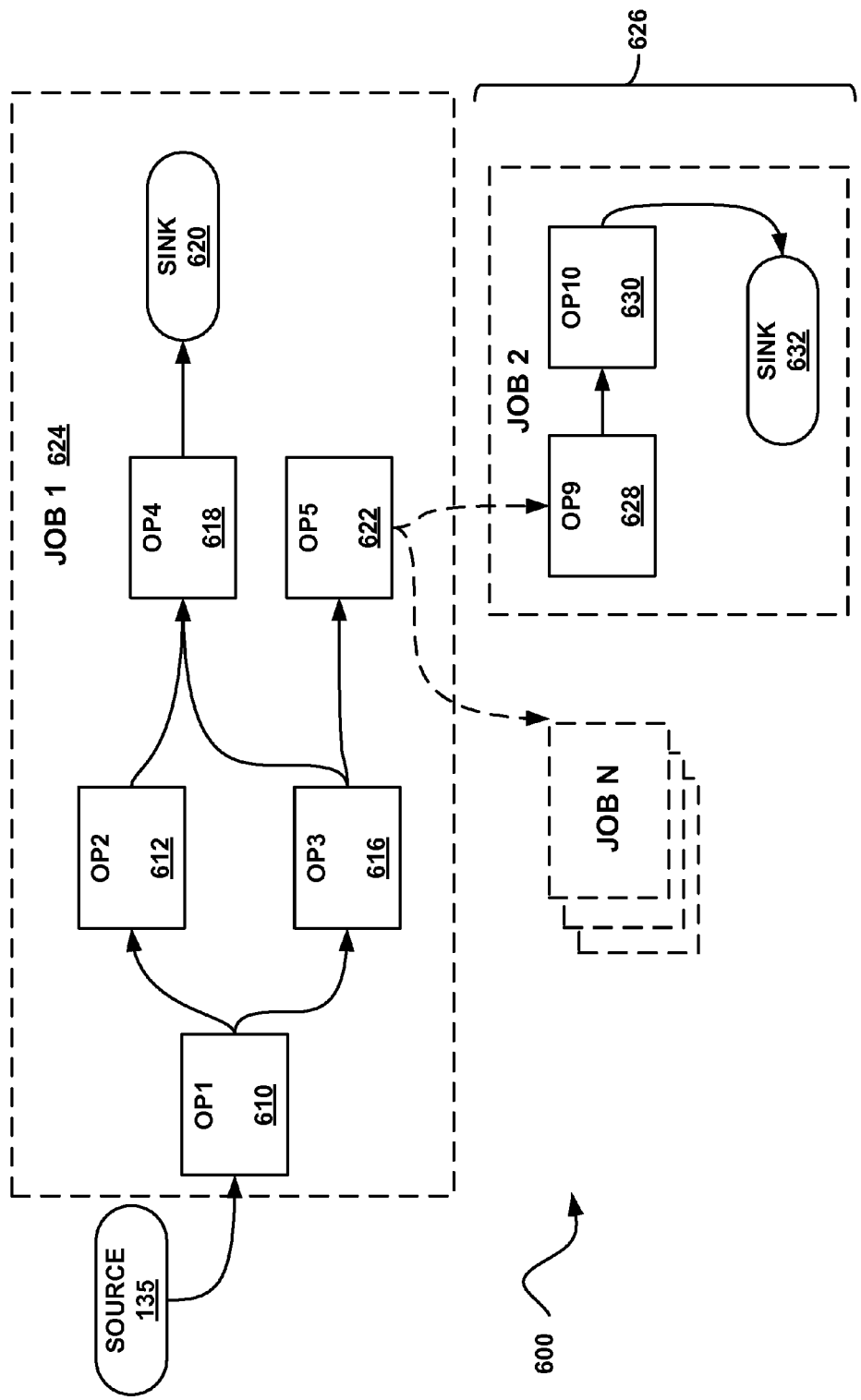
FIG. 6 illustrates an operator graph with a dynamic connection, according to various embodiments.

FIG. 6 illustrates an exemplary operator graph 600 with dynamic connections according to an embodiment. The operator graph 600 may receive a data stream from a source 135. The operator graph 600 may have one or more jobs, e.g., Job 1, Job 2 through Job N according to various embodiments. Although the operator graph 600 illustrates Job 1 receiving the output from a source 135 and transmitting the output from Job 1 to other jobs, the jobs may be interconnected with more than one source and may have one or more dynamic stream connections between the jobs.

According to various embodiments, stream operator 610 may receive a tuple from source 135. The output of stream operator 610 may further be received by stream operator 612, stream operator 616, or both for further processing. Though represented as a single stream operator, stream operators 610 through 618 may be a plurality of stream operators according to various embodiments. Stream operators 612 and 616 may both transmit their output to stream operator 618 which may receive a tuple after stream operators 612 and 616 process the tuple. In the shown embodiment, stream operator 618 may output to a sink 620. In other embodiments, stream operator 618 may provide input for additional stream operators.

The output of stream operator 616 may be transmitted to stream operator 622. Stream operator 622 may be configured to output to one or more jobs 626. In various embodiments, the connection between stream operator 622 and the one or more jobs 626 may be dynamic and may be established by a user, e.g., an application programmer, or application user. In other embodiments, the dynamic connection between stream operator 622 and the one or more jobs 626 may be established by the stream manager 134. The dynamic connection may also be established by activating an input port on a stream operator, e.g., the stream operator 628 on Job 2, to allow tuples to process.

The Job N is shown to illustrate that there could be more than one job running concurrently. Job 2 may contain stream operator 628, stream operator 630, and sink 632. A dynamic connection may be established between stream operator 622 and stream operator 628 from Job 2. Stream operator 628 may receive tuples from stream operator 622 and stream operator 628 may transmit the tuple to stream operator 630. Stream operator 630 may transmit an output stream to a sink 632.

Some jobs may be configured to accept dynamic connections by other users or applications. These dynamic connections may make a callback to an upstream stream operator to notify it that there is a connected entity according to various embodiments. An upstream stream operator may be a stream operator that is located closer to the tuple source from the dynamic connection, according to some embodiments. In other embodiments, the monitor 340 may periodically check dynamic connections by polling the stream operators at time intervals which may also be referred to as a polling frequency. For example, the monitor 340 may request connection status of the stream operator 622 to see if a dynamic connection is present at a consistent time interval, e.g., every 3 microseconds. The stream operator 622 may respond with the dynamic connection status to the monitor 340 once the polling signal is received. In other embodiments, the stream manager 134 may use the polling results from the monitor 340 to provide a more or less frequent polling mechanism by examining patterns of the dynamic connection, i.e., a dynamic connection history. For example, if a particular dynamic connection has preceded a large number of dynamic connections to other jobs, then the stream manager 134 may poll the stream operators more frequently. In other embodiments, a particular stream operator may continuously poll for dynamic connections and push connection status to the stream manager 134 without a request from the stream manager 134.

Operator graph 600 illustrates that it may be possible to stop receiving tuples at the input port of stream operator 622 or stop outputting tuples at the output port of stream operator 622 when the dynamic connection is not connected in order to prevent unnecessary processing. This may prevent a tuple from being output to a disconnected dynamic connection. In this embodiment, it may be possible to restart the processing at stream operator 622 when the dynamic connection is present by enabling the output port of stream operator 622 or enabling the input port of stream operator 622 depending on processing needs.

In some embodiments, a callback may continue upstream such that stream operator 616 is turned off and the tuple is never output to stream operator 622. In another embodiment, it may be possible to use a callback routine to stop processing on certain attributes that are only used by a dynamic connection when that connection is not present. For example, when the dynamic connection is disconnected, there may be attributes that are only processed by stream operator 622. In that case, it may be possible to stop processing upstream of these attributes at stream operator 616 or stream operator 610.

In some embodiments, it may be possible to stop processing at additional upstream operators that would output to a disconnected dynamic connection. According to various embodiments, a particular stream operator may be deactivated by the stream manager 134 which may stop the processing on the stream operator. In other embodiments, the connection and disconnection of output or input ports of a particular stream operator may deactivate a stream operator. For example, if the output port of stream operator 616 stops transmitting or outputting tuples processed by stream operator 616 to stream operator 622, then stream operator 622 may be deactivated. In this example, the stream operator 616 would still be processing the tuple even though the tuple is not being output. However, if the input port of stream operator 616 stops receiving tuples, then stream operator 616 and stream operator 622 may be deactivated and may reduce the processing load of the operator graph 600.

The deactivation of stream operators or the input or output ports of stream operators may occur in a partial configuration. For example, the input port of stream operator 616 may be activated to allow processing of some attributes of the tuples that may be required for stream operator 618 but deactivated to exclude receiving attributes that may be required for stream operator 622. The exclusion of attributes may deactivate stream operator 622 downstream but not stream operator 618.

According to various embodiments, the processing of a stream may be stopped when a dynamic connection is disconnected. Tuples may be left unprocessed or may be recovered and recycled once the dynamic connection is reconnected.

Runtime flags may be added to stream operators within the operator graph 600. The runtime flags may stop processing of a various attributes of a tuple in response to the presence of a dynamic connection according to various embodiments. The runtime flags may be placed on any stream operator by a user or the stream manager 134. For example, a runtime flag may be associated with a stream operator 618. If an attribute of stream operator 618 is also used by stream operator 628 and the dynamic connection between stream operator 622 and stream operator 628 is not present, then the user may select to discard the processing of the attribute to increase performance.

The dynamic connection may be disconnected based on a runtime flag associated with a tuple, e.g, by associating the runtime flag with metadata or an attribute of the tuple, according to various embodiments. For example, stream operator 622 may receive this tuple with the runtime flag and the runtime flag may instruct the stream operator 622 to stop transmitting an output from the output port to Job 1 or a plurality of jobs 626.

To illustrate how the operator graph 600 may function, and not any other limitation, an example of a tollbooth may be described. The source 135 may combine or provide a tuple with attributes corresponding to each car entering a tollbooth. The stream operator 610 may process the incoming data stream to determine how the tuple will be handled. Stream operators 612 and 616 may process different attributes of the tuple or process the same attributes in different ways. For example, stream operator 612 may process the color of the car using a camera feed and color detecting mechanism. Stream operator 616 may attempt to transcribe the license plate of the car. The output from both stream operators 612 and 616 may be received by stream operator 618 which may store the license plate of the car in a transcribed character format.

The stream operator 622 may attempt to process the state or province of the transcribed license plate of the car. The dynamic connection between Job 1 and Job 2 may be established by the stream manager 134 as described in FIG. 8. The stream operator 622 may allow the output port of stream operator 622 to transmit the tuple to Job 2 based on a runtime flag. Job 2 may attempt to match personal information regarding the registered owner of the car from a state or provincial database to the car. For example, the stream operator 622 may transmit to the input port of the first operator of Job 2, e.g., stream operator 628. Stream operator 628 may fetch state or provincial Department of Motor Vehicle data from an external source and stream operator 630 may perform a matching process until the tuple is transmitted to the sink 632. The connections between jobs may be dynamic depending on requirements of the user. The user may desire to establish the personal information feature of Job 2 only when a car is reported stolen, according to various embodiments.

In stream operator 618, the runtime flag may be activated in the absence of the dynamic connection. For example, the license plate transcription function of stream operator 618 may be deactivated and the license plate may be stored as an image to save on processing in the absence of the dynamic connection.

Figure 7:
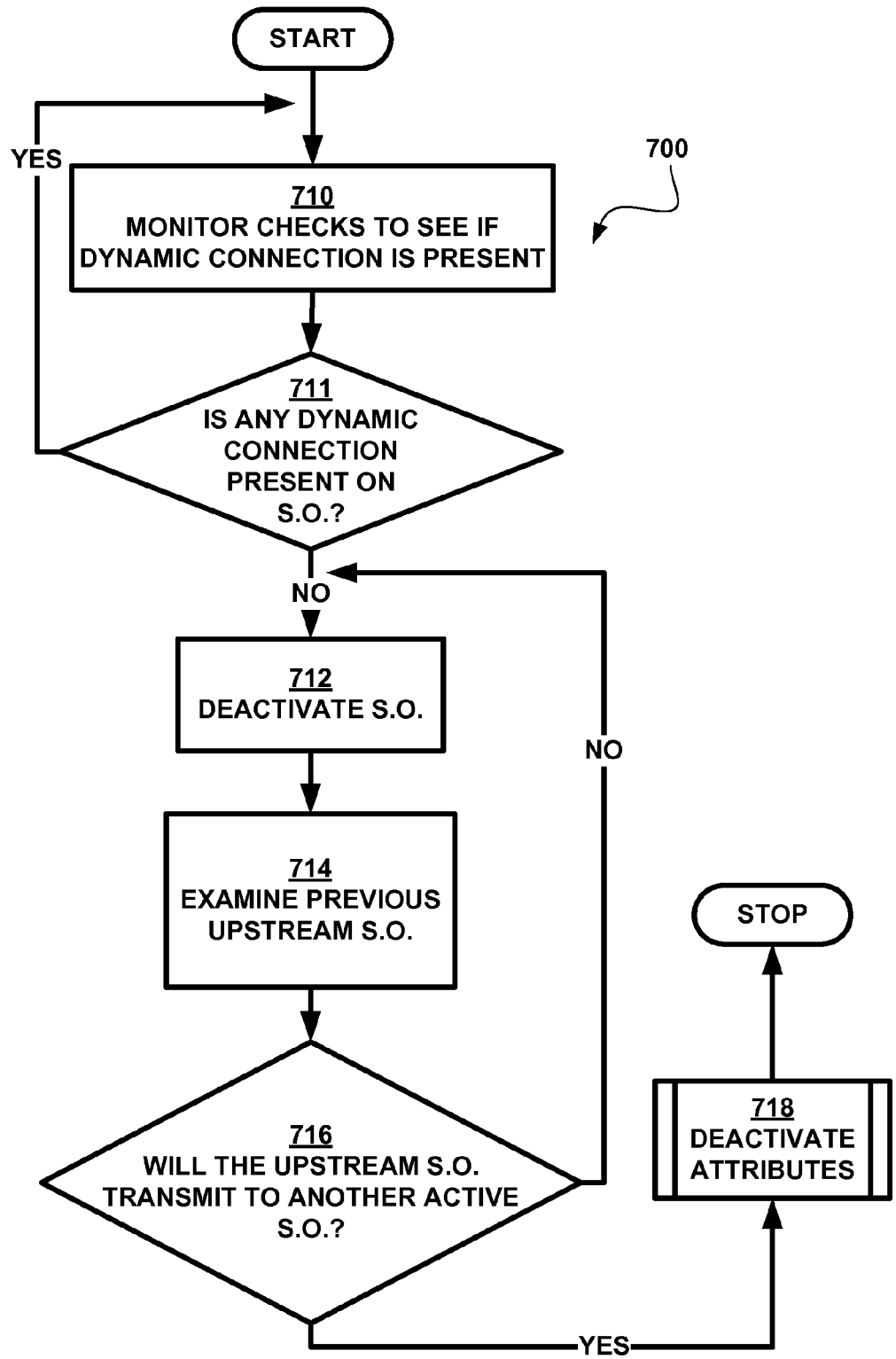
FIG. 7 illustrates a flow chart of a method of deactivating a stream operator in response to a dynamic connection in FIG. 6, according to various embodiments.

FIG. 7 illustrates a method 700 for deactivating a stream operator in the absence of a dynamic connection according to some embodiments. As shown, the method 700 begins at operation 710, when the monitor 340 from FIG. 3 may determine whether a dynamic connection between any stream operators, such as stream operators 622 and 628, exists.

The monitor 340 may continuously poll the stream operators or poll stream operators at consistent intervals. In operation 711, the stream manager 134 may determine if a dynamic connection exists between any two stream operators. For example, a dynamic connection between stream operator 622 and 628 may exist if the stream operator 628 receives a tuple from stream operator 622. In other embodiments, a dynamic connection may not be present on a particular stream operator, e.g., stream operator 622, if another dynamic connection exists on another stream operator chain, e.g., stream operator 612. If any dynamic connection exists, e.g., between stream operator 622 and any job, then the operator graph 600 may take limited action.

If the dynamic connection is not present, then the method 700 may continue to operation 712. In operation 712, the stream manager, e.g., stream manager 134, may deactivate one or more stream operators, e.g., stream operators 622 or 628, according to various embodiments. In other embodiments, a particular stream operator may be deactivated automatically if no tuples are received for a period of time. For example, an input port of stream operator 622 may deactivate if 5 seconds elapse with no tuples received from stream operator 616 according to an embodiment.

Once stream operator 622 is disconnected, the method 700 continues to operation 714. In operation 714, stream operators upstream from the deactivated stream operator, e.g., stream operator 616, may be examined by the stream manager 134. The stream manger 134 may determine if a previous output port, e.g., stream operator 616, only outputs to the deactivated stream operator, e.g. stream operator 622. In operation 716, the stream manager 134 may determine if the stream operator, e.g., stream operator 616, transmits a tuple to another active stream operator, e.g., stream operator 618, besides the deactivated stream operator, e.g., stream operator 622. If the stream operator does not transmit a tuple to another active stream operator besides the deactivated stream operator, then the method 700 may continue to operation 712. If the stream operator transmits a tuple to another active stream operator, then the method 700 may continue to operation 718 in FIG. 9.

Figure 8:
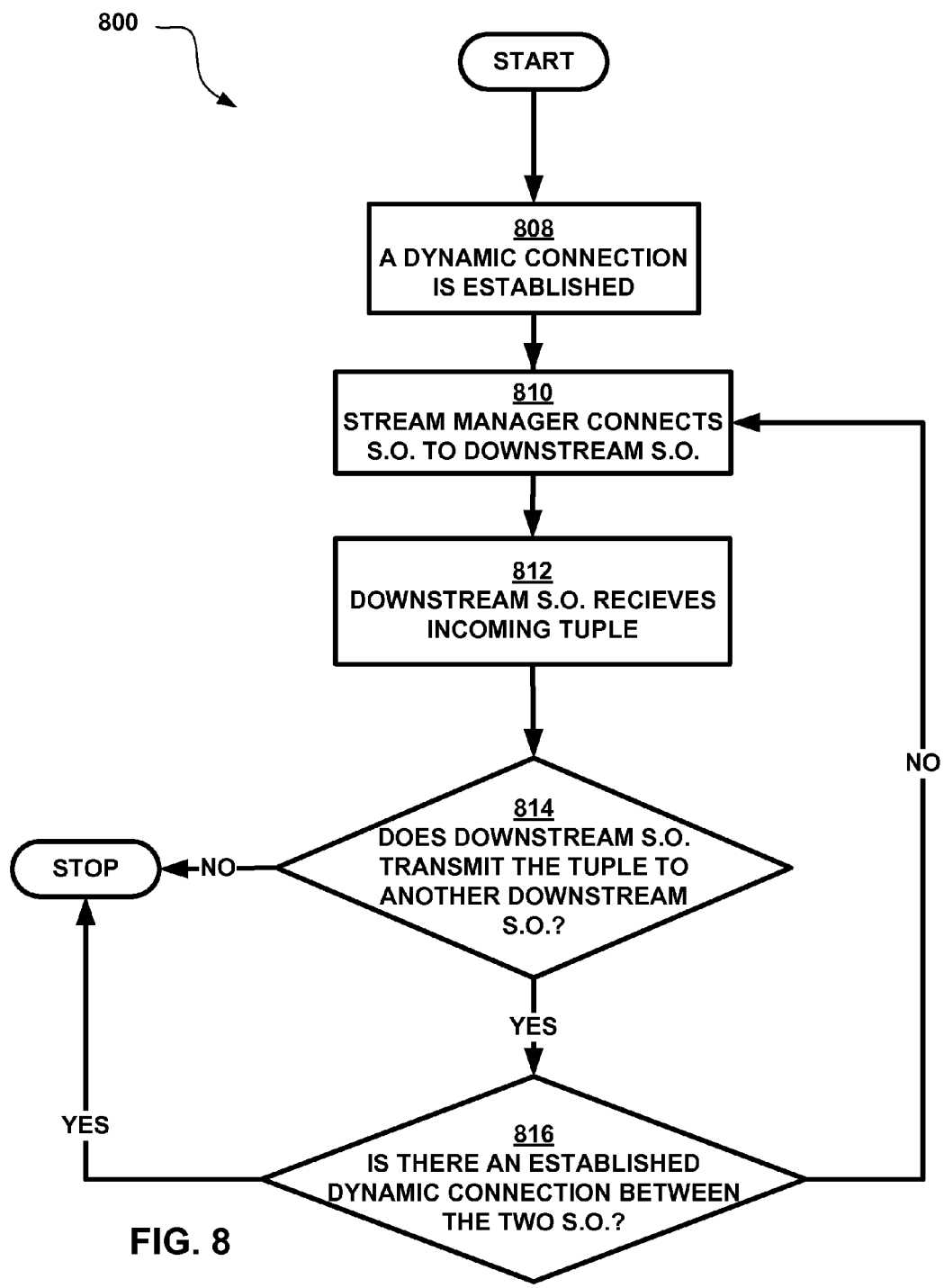
FIG. 8 illustrates a flow chart of a method of activating deactivated stream operators, according to various embodiments.

FIG. 8 illustrates a method 800 for activating deactivated, dynamically-connected stream operators according to an embodiment. In one embodiment, the method 800 begins at operation 808 when a dynamic connection is established from Job 1 to another job, e.g., Job 2. The method 800 may continue to operation 810, when a first upstream deactivated stream operator, e.g., stream operator 616, may receive a signal from the stream manager 134 to output from all or part of the output ports from the disconnected stream operator, e.g., stream operator 616. The deactivated stream operator 616 may receive a tuple with a runtime flag that signals the stream operator 616 to output to a downstream stream operator, e.g. stream operator 622.

The stream manager 134 may send a signal to connect the stream operator 616 output port to the stream operator 622 immediately or the stream manager 134 may delay connecting stream operators in order to wait for one or more stream operators to connect to downstream operators. For example, if a tuple is received by stream operator 616, the stream operator 616 may wait until downstream stream operator, e.g., stream operators 622, output ports transmit to a job.

The method 800 may continue to operation 812, where the downstream stream operator, e.g., stream operator 622, may receive the tuple and continue to operation 814. In operation 814, the stream manager 134 may determine whether the output of the downstream stream operator, e.g., stream operator 622, transmits the tuple to another stream operator, e.g., stream operator 628. If the downstream stream operator 622 does not transmit to another stream operator, e.g., stream operator 628, then the method 800 may stop.

If the output of the downstream stream operator, e.g. stream operator 622, transmits the tuple to another operator, e.g., stream operator 628, the method 800 may proceed to operation 816, according to various embodiments. In operation 816, the stream manager 134 may determine if the downstream stream operator, e.g., stream operator 622, connects to another downstream operator, e.g., stream operator 628, through a dynamic connection. For example, if stream operator 622 transmits a tuple to stream operator 628 through a present dynamic connection, then the method 800 stops. If the downstream stream operator does not transmit the tuple through a dynamic connection, then the method 800 may continue to operation 810 and the method may repeat until all utilized stream operators are active.

In another embodiment, a dynamic connection between Job 1 and a one or more jobs 626 may first be established in a manner similar to operation 808. In the shown example, operator 622 and Job 1 may reestablish the dynamic connection by a signal from the stream manager 134. Once the dynamic connections are established, the stream manager may allow the output port for all stream operators upstream from the dynamic connection to transmit to downstream stream operators. In the shown example, stream operators 622 and 616 may be reconnected. In some embodiments, it may be possible to have an additional callback routine on a particular stream operator that will initiate all processing when a dynamic connection is made.

Figure 9:
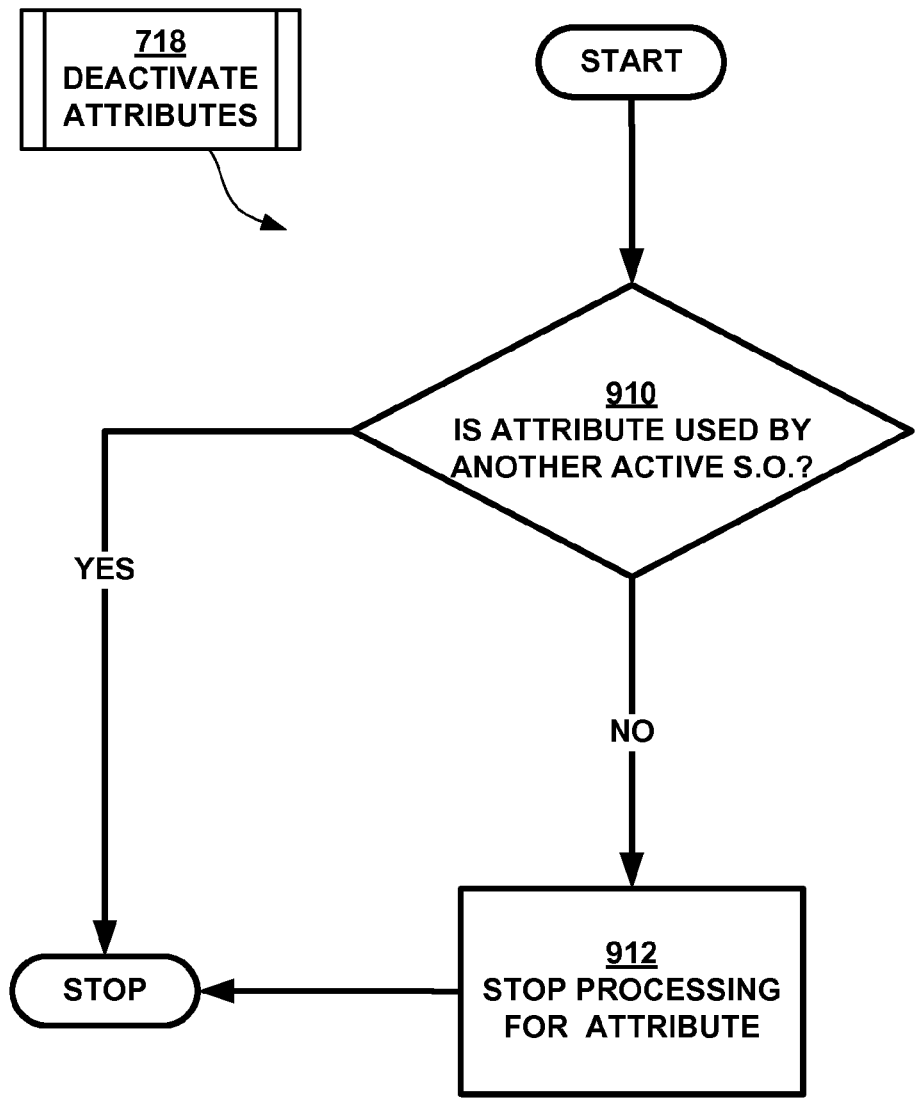
FIG. 9 illustrates a continuation of the method described in FIG. 7 to deactivate particular attributes of stream operators according to various embodiments.

FIG. 9 illustrates an embodiment for an implementation of stopping processing for some attributes for the data stream in operation 718. In operation 718, the stream manager 134 may instruct a stream operator, e.g., stream operator 616, to selectively stop processing for some attributes that would be output to a deactivated stream operator, e.g., stream operator 622.

Operation 718 may receive the stream of tuples from operation 716 in FIG. 7. In operation 910, the stream manager 134 may determine if the attribute will be used by another active stream operator, such as stream operator 618. If yes, then the operation 718 may stop. If no, then operation 718 may continue to operation 912. In operation 912, the stream manager 134, may stop processing on the stream operator, e.g., stream operator 616, for the attribute. For example, using the tollbooth example, the license plate processing of stream operator 616 may be limited by stopping the output port of stream operator 616 that may output the state or provincial transcription for the license plate.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language such as Java, Smalltalk, C++, or the like; (b) conventional procedural programming languages, such as the "C" programming language or similar programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

While the foregoing is directed to exemplary embodiments, other and further embodiments of the invention may be devised without departing from the basic scope thereof, and the scope thereof is determined by the claims that follow.

What is claimed is:

1. A method for processing a stream of tuples, comprising:
   receiving a stream of tuples to be processed by a plurality of processing elements operating on one or more computer processors, each processing element having one or more stream operators;
   determining whether a dynamic connection exists at a first stream operator, wherein the dynamic connection connects the first stream operator to a second stream operator, wherein the dynamic connection allows introduction of one or more additional stream operators without modifying an operator graph of the one or more stream operators, wherein the first stream operator is from a first application instance and the second stream operator is from a second application instance;

determining, in response to determining an absence of the dynamic connection between the first stream operator and the second stream operator, whether an upstream stream operator from the dynamic connection transmits to another active stream operator; and deactivating the upstream stream operator in response to the absence of the dynamic connection, wherein the deactivating the upstream stream operator occurs by deactivating an input port of the stream operator.

2. The method of claim 1, wherein the determining whether a dynamic connection exists includes monitoring the one or more stream operators.

3. The method of claim 2, wherein the monitoring includes polling a stream operator and modifying a polling frequency based on a dynamic connection history.

4. The method of claim 1, wherein the deactivating the upstream stream operator includes using a runtime flag.

5. A method for processing a stream of tuples, comprising:
receiving a stream of tuples to be processed by a plurality of processing elements operating on one or more computer processors, each processing element having one or more stream operators;

determining whether a dynamic connection exists at a first stream operator, wherein the dynamic connection connects the first stream operator to a second stream operator, wherein the dynamic connection allows introduction of one or more additional stream operators without modifying an operator graph of the one or more stream operators, wherein the first stream operator is from a first application instance and the second stream operator is from a second application instance;

polling the first stream operator and the second stream operator for a presence of the dynamic connection; and modifying processing of one or more upstream stream operators in response to a change in use of the dynamic connection.

6. The method of claim 5, the modifying processing comprises deactivating the upstream stream operators.

7. The method of claim 5, the modifying processing comprises activating the upstream stream operators.

8. The method of claim 6, wherein deactivating the upstream stream operators includes processing less than all attributes of a tuple.

9. The method of claim 1, wherein the deactivating the upstream stream operator includes:

determining whether an attribute from the stream of tuples is processed by another active stream operator;

stopping the processing for the attribute in response to the attribute not being processed by another active stream operator.

10. The method of claim 9, wherein the stopping the processing includes:
adding a runtime flag to another active stream operator; and
discarding processing of the attribute in response to a presence of the runtime flag.

11. The method of claim 1, further comprising:
connecting the upstream stream operator to the first stream operator;
determining whether the first stream operator transmits a tuple from the stream of tuples to the second stream operator; and
activating the upstream stream operator, the first stream operator, and the second stream operator, in response to the first stream operator transmitting the tuple.

12. The method of claim 1, further comprising determining whether the upstream stream operator from the dynamic connection transmits to another active stream operator by receiving a push connection status from the another active stream operator via continuous polling of dynamic connections by the another active stream operator.

13. A method for processing a stream of tuples, comprising:
receiving a stream of tuples to be processed by a plurality of processing elements operating on one or more computer processors, each processing element having one or more stream operators;

determining whether a dynamic connection exists at a first stream operator, wherein the dynamic connection connects the first stream operator to a second stream operator, wherein the dynamic connection allows introduction of one or more additional stream operators without modifying an operator graph of the one or more stream operators, wherein the first stream operator is from a first application instance and the second stream operator is from a second application instance;

determining, in response to determining an absence of the dynamic connection between the first stream operator and the second stream operator, whether an upstream stream operator from the dynamic connection transmits to another active stream operator; and deactivating the upstream stream operator in response to the absence of the dynamic connection, wherein the deactivating the upstream stream operator includes using a runtime flag.

* * * * *